US012661794B2

(12) United States Patent (10) Patent No.: US 12,661,794 B2
Agarwal et al. (45) Date of Patent: Jun. 23, 2026

(54) SYSTEM AND METHOD FOR PROPRIOCEPTIVE AND RESPONSIVE ROBOTIC DOOR OPENING

(71) Applicant: Ghost Robotics Corporation, Philadelphia, PA (US)

(72) Inventors: Shlok Agarwal, Philadelphia, PA (US); Avik De, Philadelphia, PA (US)

(73) Assignee: Ghost Robotics Corp., Philadelphia, PA (US)

( * ) Notice: Subject to any disclaimer, the term of this patent is extended or adjusted under 35 U.S.C. 154(b) by 0 days.

(21) Appl. No.: 18/808,390

(22) Filed: Aug. 19, 2024

(65) Prior Publication Data

US 2025/0058468 A1 Feb. 20, 2025

Related U.S. Application Data

(60) Provisional application No. 63/533,385, filed on Aug. 18, 2023.

(51) Int. Cl.
*B25J 9/16* (2006.01)
*B25J 19/02* (2006.01)

(52) U.S. Cl.
CPC ............. *B25J 9/1682* (2013.01); *B25J 9/162* (2013.01); *B25J 19/021* (2013.01); *B25J 19/026* (2013.01)

(58) Field of Classification Search
CPC ........ B25J 19/021; B25J 9/162; B25J 9/0087; B25J 11/008; B25J 13/085; B25J 9/1682; B25J 19/026
See application file for complete search history.

(56) References Cited

U.S. PATENT DOCUMENTS

| | | | |
|---|---|---|---|
| 9,561,592 B1 * | 2/2017 | da Silva | ............... B62D 57/032 |
| 9,594,377 B1 * | 3/2017 | Perkins | .................. G05D 1/021 |
| 9,987,745 B1 | 6/2018 | Berard et al. | |
| 11,565,401 B1 | 1/2023 | Pastor Sampedro et al. | |
| 2012/0074717 A1 | 3/2012 | Macfarlane | |
| 2016/0039091 A1 | 2/2016 | Bruemmer | |
| 2017/0151110 A1 * | 6/2017 | Galonska | ................. A61G 5/04 |
| 2018/0073614 A1 | 3/2018 | Claffee et al. | |
| 2019/0248016 A1 | 8/2019 | Deyle et al. | |
| 2020/0206924 A1 | 7/2020 | Pivac et al. | |
| 2020/0361101 A1 * | 11/2020 | Zhang | .................. B25J 19/0025 |
| 2020/0368919 A1 | 11/2020 | Stoelen | |
| 2021/0355739 A1 | 11/2021 | Tulsidas | |

(Continued)

OTHER PUBLICATIONS

Yaguchi et al., A design of 4-legged semi humanoid robot aero for disaster response task, 2015, IEEE, p. 61-66 (Year: 2015).*

(Continued)

*Primary Examiner* — Mcdieunel Marc
(74) *Attorney, Agent, or Firm* — White and Williams LLP

(57) ABSTRACT

The present disclosure pertains to a system and method for a robotic arm mounted on a mobile base, wherein the robotic arm applies a desired force at a point of contact between an arm and a point in the environment. One method involves low-level, automated coordination, wherein the higher-level decision making is made by a human operator, while another method addresses the variability of success in visual identification of door features, by increasing the reliance on proprioceptive cues such as forces from the door and door hinge and reducing reliance on exteroceptive cues.

25 Claims, 6 Drawing Sheets

100

102

(56) References Cited

U.S. PATENT DOCUMENTS

| | | | |
|---|---|---|---|
| 2022/0001531 A1 | 1/2022 | Kenneally et al. | |
| 2022/0219320 A1 | 7/2022 | Søe-Knudsen | |
| 2022/0395974 A1* | 12/2022 | Balasubramanian | ........................ B62D 57/028 |
| 2023/0117928 A1 | 4/2023 | Bellicoso et al. | |
| 2023/0143315 A1* | 5/2023 | Whitman | ............... B62D 57/02 701/300 |
| 2024/0246623 A1* | 7/2024 | Blankespoor | .......... G05D 1/245 |
| 2024/0383138 A1* | 11/2024 | Hamasaki | .................. B25J 5/00 |

OTHER PUBLICATIONS

Steinke et al., Demo: The Future of Dog Walking—Four-Legged Robots and Augmented Reality, 2014, IEEE, p. 352-354 (Year: 2014).*

Wellman et al., An adaptive mobility system for the disabled , 2002, IEEE, p. 2006-2011 (Year: 2002).*

Morlando et al., Nonprehensile Object Transportation with a Legged Manipulator, 2022, IEEE, p. 6628-6634 (Year: 2022).*

Chitta et al. "Proprioceptive localization for a quadrupedal robot on known terrain." Proceedings 2007 IEEE International Conference on Robotics and Automation. IEEE, 2007.

International PCT Application No. PCT/US2024/042870, International Search Report and Written Opinion mailed Nov. 6, 2024; 14 pages.

* cited by examiner

SYSTEM AND METHOD FOR PROPRIOCEPTIVE AND RESPONSIVE ROBOTIC DOOR OPENING

CROSS REFERENCE TO RELATED APPLICATIONS

This application claims the benefit of earlier filed U.S. Patent Application Ser. No. 63/533,385, filed Aug. 18, 2023, the entire contents of which are hereby incorporated by reference.

BACKGROUND OF THE INVENTION

The present invention is directed to proprioceptive and responsive robotic door opening. Robots with limbs or robots with limbs and wheels at the end, when paired with appendages that can be utilized for manipulation, can serve as effective mobile manipulators. These limbs for manipulation can have simple end-effectors for non-prehensile pushing or have wrists and grippers for grasping. This appendage facilitates mobile manipulation with features such as grasping, pushing, pulling, etc.

Legged robotic systems bring with the promise of mobility in a diverse range of terrain, and of long-uptime autonomous operations. Many applications of legged robotic systems require door traversal, both in a teleoperated and autonomous setting. For example, teleoperated door opening may be required in a search-and-rescue application, and autonomous door opening may be required in an autonomous plant inspection application.

The door opening task presents a number of challenges. For a door opening task, a door needs to be pushed or pulled open, perhaps while countering a door resistance, springiness, or weight. These dynamic properties are not known ahead of time. In addition, the location of the point on the door itself where contact has been made, and the door hinge's position with respect to it, may not be known. These factors affect the kinematic motion of the point of contact as time evolves.

Fully manual door opening requires a user to control the motion and force application by the arm. Since the motion of the door is constrained, it is important to only apply large forces in directions that are not constrained. In a teleoperated setting, this is difficult for an operator since the amount of force feedback may be limited by the user interface available. Additionally, the motion of the robot base must be controlled simultaneously with the motion of the robot arm.

This is also very difficult for the operator, since the arm end-effector has six degrees of freedom, and the robot base has at least three additional degrees of freedom. Managing all of these degrees of freedom requires cycling through different input modes or configurations repeatedly, resulting in a significant operator cognitive load.

The difficulty of fully teleoperated manual door opening suggests a degree of automation. On the other hand, fully autonomous door opening is a very challenging technical problem.

While there are solutions to this problem, the reliability of fully autonomous solutions is not typically very high due to the variability of real-life door mechanics as well as visual feedback due to lighting and door appearance. To address the variability of success in visual identification of door features, we find it prudent to increase the reliance on proprioceptive cues such as forces from the door and door hinge and reduce reliance on exteroceptive cues. This paradigm is referred to herein as "proprioceptive" door opening.

Since the door opening procedure has a lot of complexity and a number of sequential steps, a failure in any one of these steps, or the transitions between them, will result in a failure of the whole operation. In addition, even if all the steps are successful, there may be situations where an operator would like to intervene instead of waiting for the operation to complete. For example, and not by way of limitation, in robotic first-responder settings, the operator may prefer to not fully open the door after they get visual feedback of what is behind the door. In these cases, a semi-automated method, where the low-level coordination is automated, but the higher-level decision making is made by the human operator, may be preferred. This paradigm is referred to as "responsive" door opening herein.

SUMMARY OF THE INVENTION

The present invention pertains to a system and method for a robotic arm which may be mounted on a mobile base, wherein the robotic arm may apply a desired force at a point of contact between an arm and a point in the environment. If a wrist is attached to the arm, the present invention may require an ability to control the moment between the end-effector and the environment.

One approach to door opening is to estimate the kinematic motion constraints of the door along with a model of the door dynamics. While this approach can make the problem easier in some settings, it is not always generalizable to the real world. Firstly, doors can differ in their type of springiness or weight, making it difficult to use pre-determined models. Secondly, perception can be unreliable in some lighting conditions, and also has difficulty when the door looks different from the previously assumed model. The present invention provides an approach which does not rely on any exteroception, or any predetermined models of the door. Instead, the present invention relies on proprioception and optionally human in-the-loop decision-making (to the minimal extent for success).

The other unique aspect of the present invention is the fact that the method is responsive to the input velocity command to the robot base, which is received from user input or a higher-level algorithm. The robot arm door opening is an automated response to the velocity input to the base, allowing the opening motion to be started and paused in a responsive manner.

In addition, the estimated door parameters can be used to assist the robot base to navigate through the door opening. The effect of this method is that the user or higher-level algorithm can simply grasp the doorhandle and drive the robot base toward and through the door in case of a push door or drive backward after grasping to open a pull door and then drive forward through the door opening. The coordination of the robot arm to open the door and hold it open, as well as any assistance to the robot base, are handled automatically.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The various embodiments are illustrated by way of example, and not by way of limitation, in the figures of the accompanying drawings. Having thus described the invention in general terms, reference will now be made to the accompanying drawings, which are not necessarily drawn to scale, and wherein.

DETAILED DESCRIPTION OF THE PREFERRED EMBODIMENT

Figure 1:
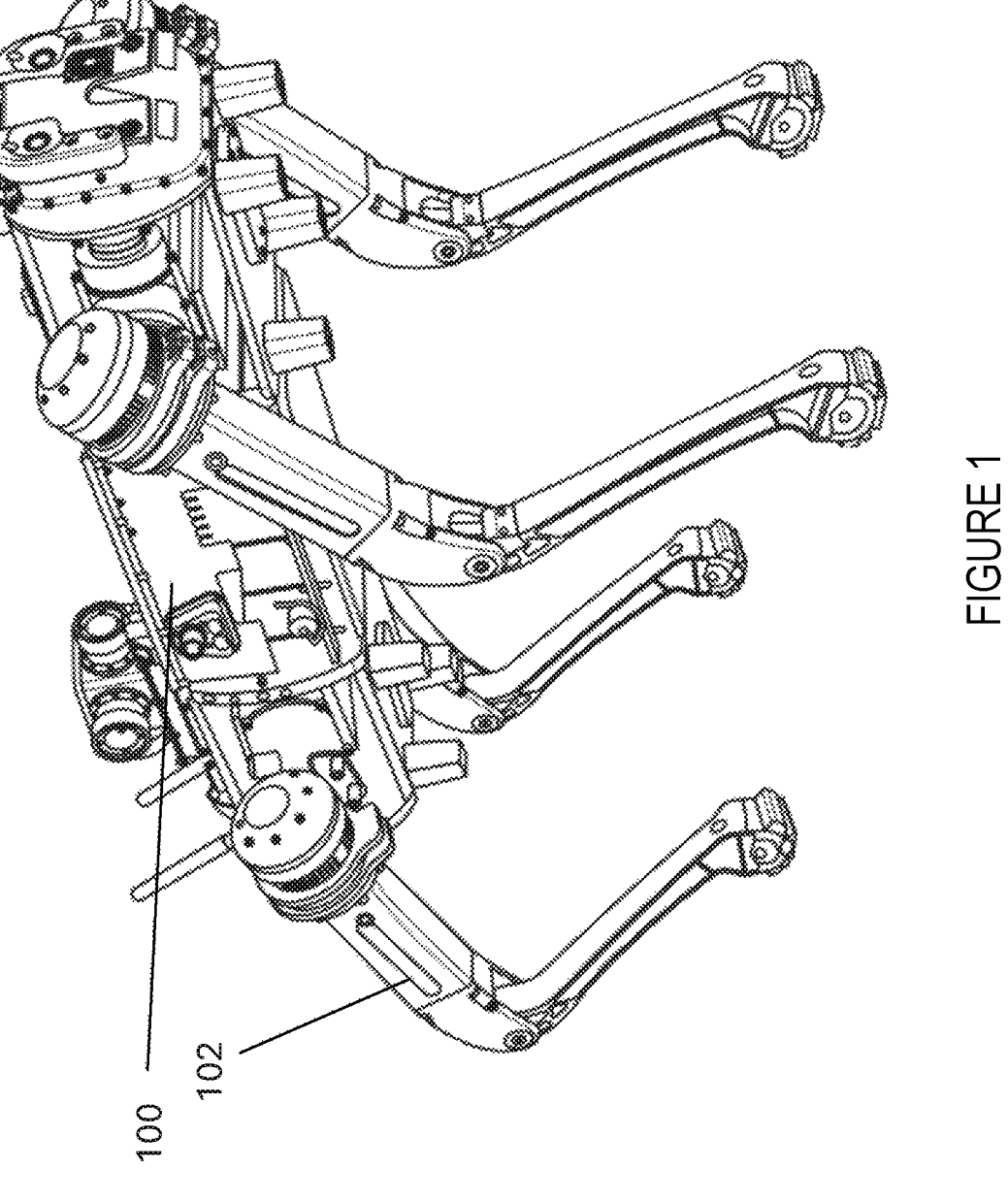
FIG. 1 depicts a legged robot.

FIG. 1 depicts a legged robot. In accordance with the preferred embodiment of the present invention, a robot comprising a robot base 100 and one or more legs 102 attached to the robot base 100 is configured to locomote. In the preferred embodiment of the present invention, an arm may be attached to the robot base 100 configured to open doors. The legged robot should be configured to traverse a variety of terrain, move in more than one direction, and resist toppling forces caused by interaction with a door or door-opening mechanism such as a doorknob, a door handle, or a push-bar. The robot may be in communication with a user interaction device and a processor coupled to a memory. The user interaction device may be configured to receive visual and audio data from the robot and may be equipped with at least one joystick which may be used to control or assist with robot navigation. The processor may be configured to send and receive data from the user interaction device the legged robot. Upon receiving a command to execute door-opening instructions, the processor can cause the robot to execute a plurality of commands.

Figure 2:
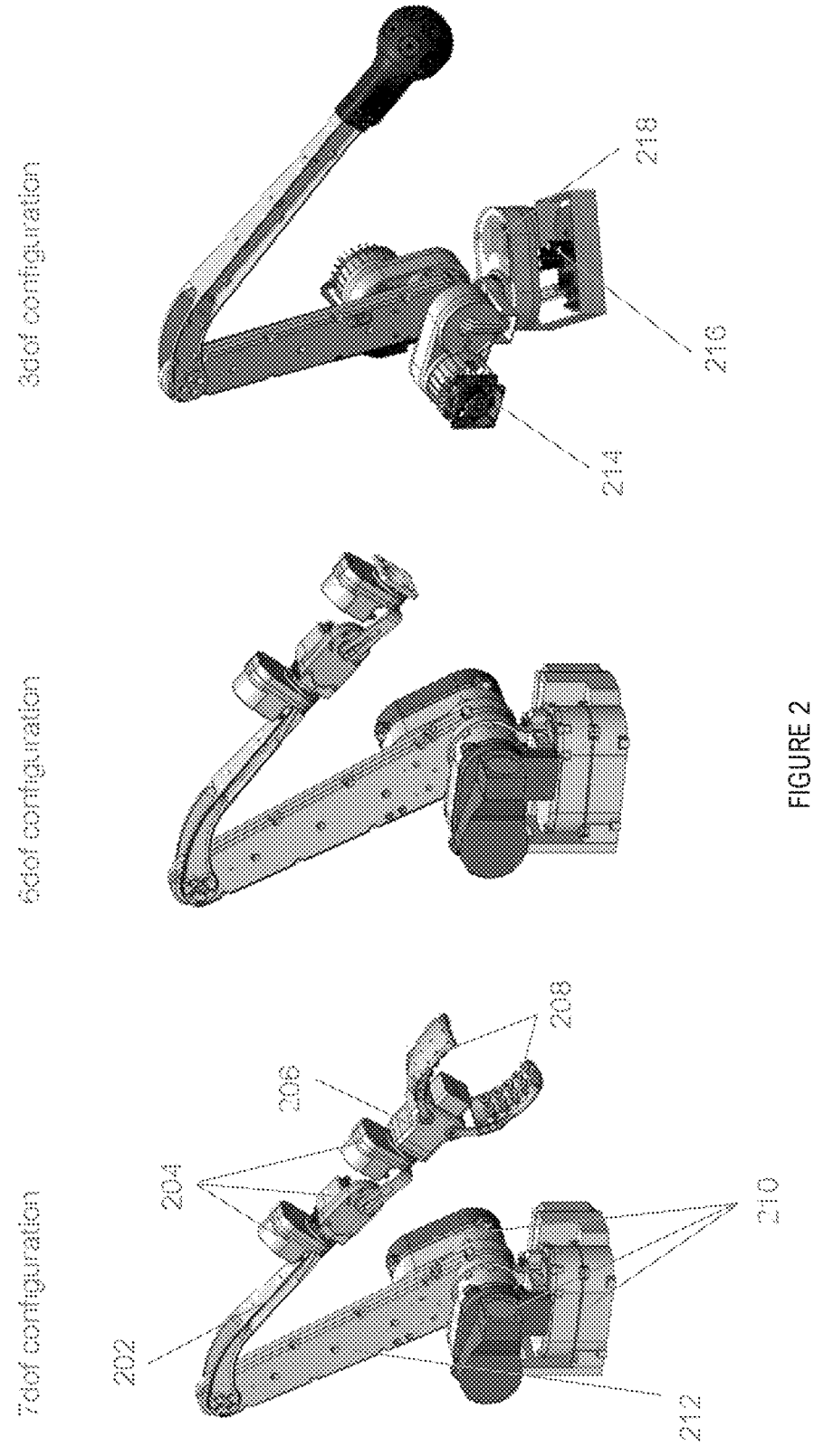
FIG. 2 depicts a robot arm in seven (7) degrees of freedom ("DoF") with gripper, 6-DoF without gripper, and 3-DoF non-prehensile pushing configurations.

FIG. 2 depicts a robot arm in 7 degrees of freedom ("DoF") with gripper, 6-DoF without gripper, and 3-DoF non-prehensile pushing configurations. In accordance with the preferred embodiment of the present invention, the robot arm may be in a configuration with 7-DoF 200 comprise arm base actuators 210, an arm first link 212, an arm second link 202, wrist actuators 204, a gripper 206, and gripper jaws 208. In an alternative embodiment, the robot arm may have 6-DoF. In this embodiment, the robot arm is not equipped with a gripper 206 or gripper jaws 208 as depicted in the 7-DoF configuration 200. In another alternative embodiment, the robot arm may be in a 3-DoF configuration. In this and other alternative embodiments, the robot arm may be equipped with an arm base actuator encoder 218, arm base actuators drive electronics 216, and arm base actuator cooling fan 214. In this and other embodiments, the 3-Dof configuration is a non-prehensile pushing configuration. The arm may be configured such that it is capable of opening and closing a door via a door handle, a doorknob, or other door-opening mechanism located on a door. Furthermore, the end-effector may be equipped with at least one camera.

Figure 3:
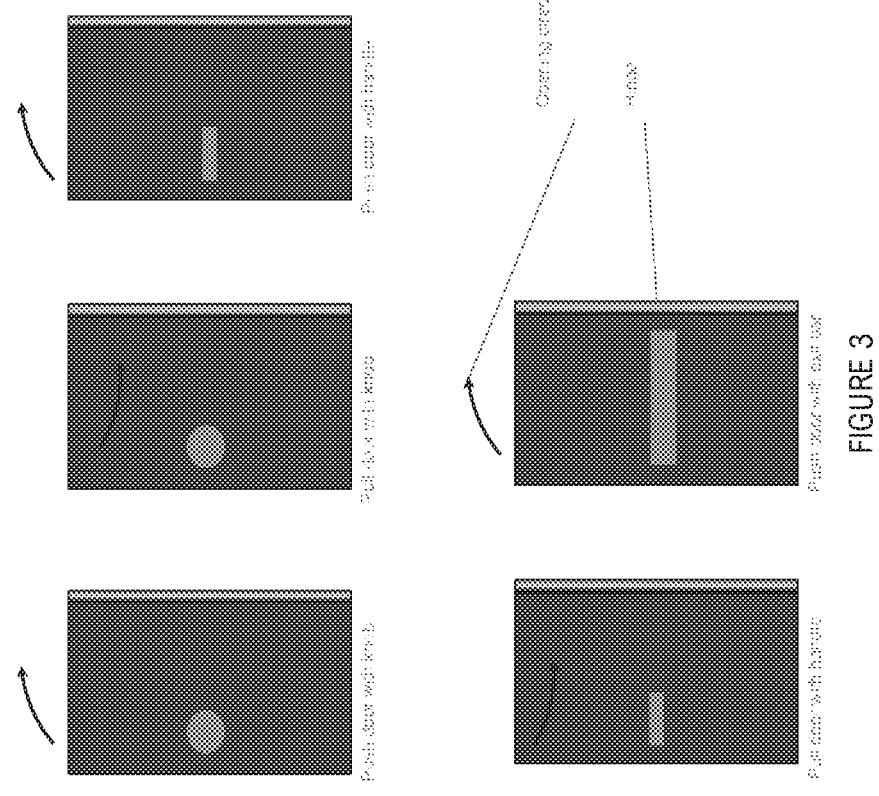
FIG. 3 depicts various configurations of doors (mirrored for doors with left hinges).

FIG. 3 depicts various configurations of doors (mirrored for doors with left hinges). In accordance with the preferred embodiment of the present invention, several door configurations are contemplated herein for which the robot may be configured to navigate. For example, and not by way of limitation, the robot may be configured to open a push door with a knob, a pull door with a knob, a push door with a handle, a pull door with a handle, and a push door with an exit bar. "Push" herein refers to a door which opens away from the robot, and "pull" herein refers to a door which opens toward the robot.

Figure 4:
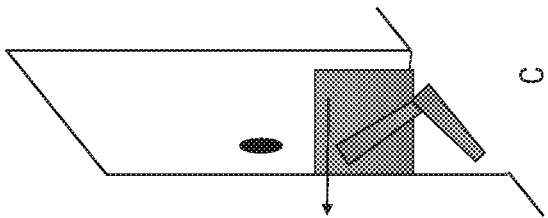
FIG. 4 depicts snapshots of execution for a push door.
Figure 4:
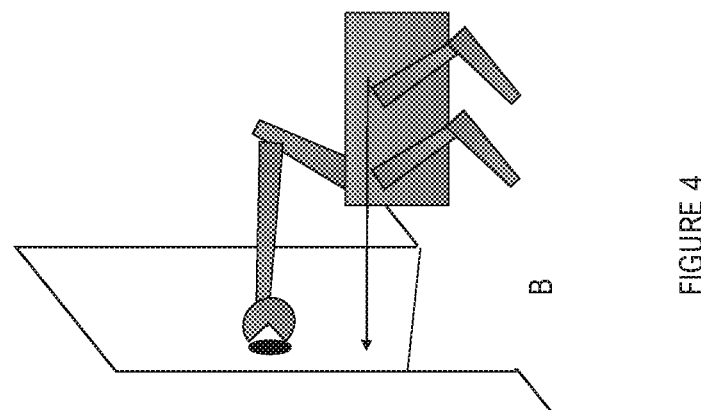
Figure 4:
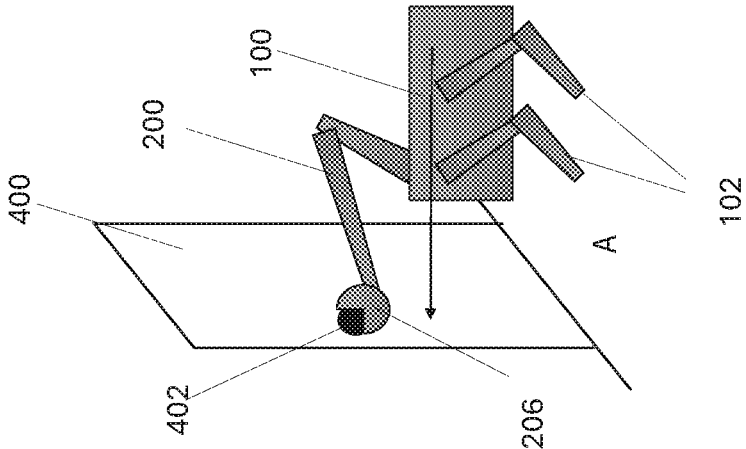

FIG. 4 depicts snapshots of execution for a push door. In accordance with the preferred embodiment of the present invention, the force application direction is continuously adjusted according to the door estimate, resulting in a consistent moment on the door. In the case of a push door, as the robot base is driven forwards, due to the consistent moment on the door, the door opens. As the robot base continues forward, the door is released. As shown in FIG. 4, the robot may approach a door 400 containing a doorknob 402 or other door-opening mechanism (as shown in frame A of FIG. 4). In the depicted scenario, the robot, comprising the base 100, the legs 102, and the arm 200 with a gripper 206, uses the gripper 206 to engage with the doorknob 402 in order to open the door 400. Once the door has been opened, the robot advances through the door frame (as shown in frame B of FIG. 4). In order to keep the door open, the robot may continue to hold the door open at the doorknob with the gripper 206 or may adjust position so that the arm 200 is holding the door open at a position other than the doorknob (as shown in frame C of FIG. 4). The arrow depicts the direction of the robot base motion from user input.

Figure 5:
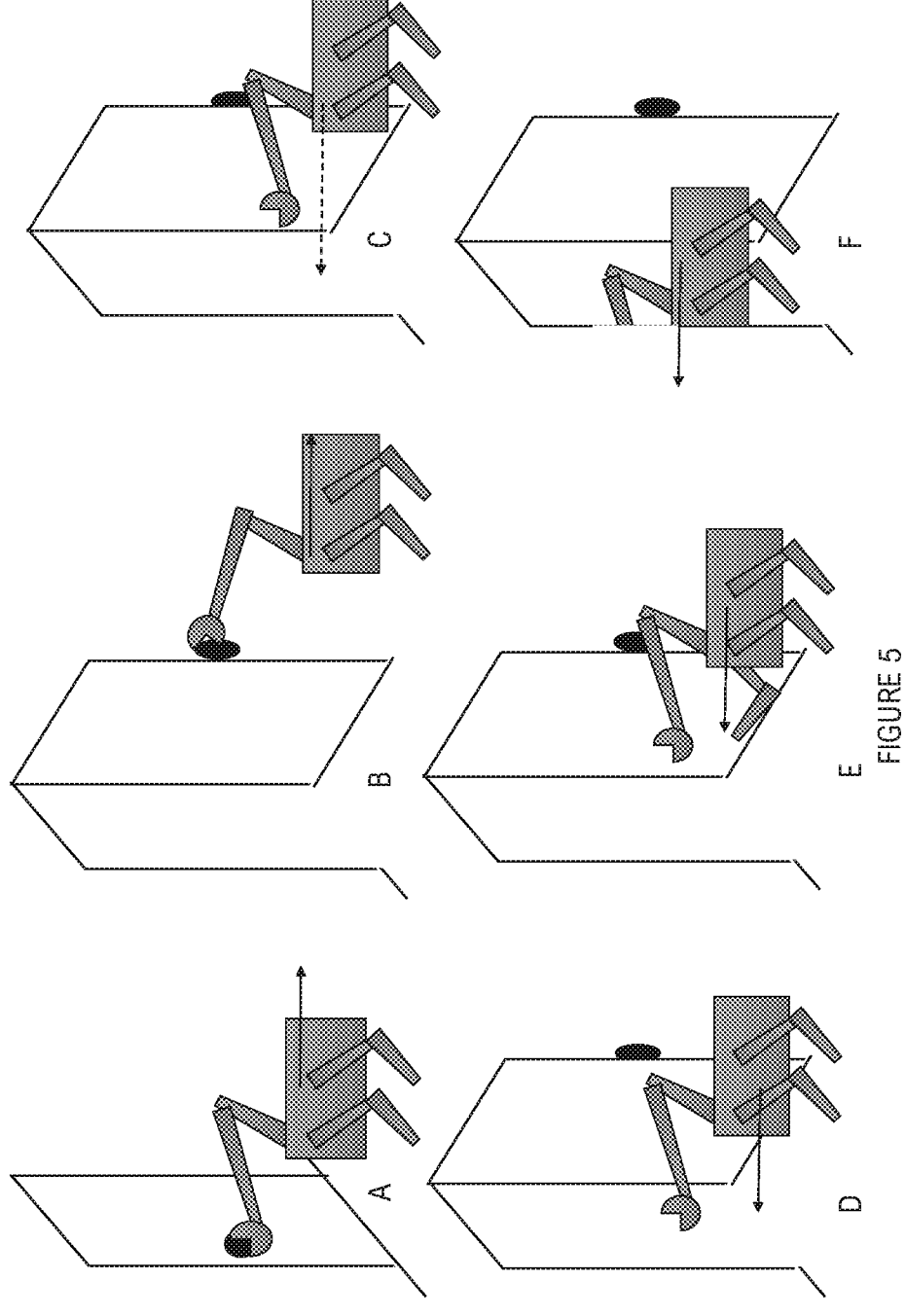
FIG. 5 depicts snapshots of execution for a pull door.

FIG. 5 depicts snapshots of execution for a pull door. In accordance with the preferred embodiment of the present invention, in the case of a pull door, as the robot base is driven backwards, due to the consistent moment on the door, the door opens. Following the door estimation, when the robot base is clear of the door in its open position, a fore/aft assistive controller stops the robot fore/aft motion while the door is fully opened. The door is then blocked from closing as the arm reacquires a grasp on the pushing side of the door (such that it doesn't close if it is a weighted door). Methods to do this include: a fore/aft assistance controller then drives the robot base forward such that the robot base interferes with the closing path of the door (as shown in frame C of FIG. 5); a dynamic arm movement to reacquire a pushing contact before the door has sufficient time to close (as shown in frame D of FIG. 5); or blocking the door's motion with an extended leg or foot while the arm moves to reacquire a grasp (as shown in frame E of FIG. 5). The solid arrows in FIG. 5 represent robot base motion from user input, while the dashed arrow in FIG. 5 represents robot base motion from fore/aft assist controller.

Figure 6:
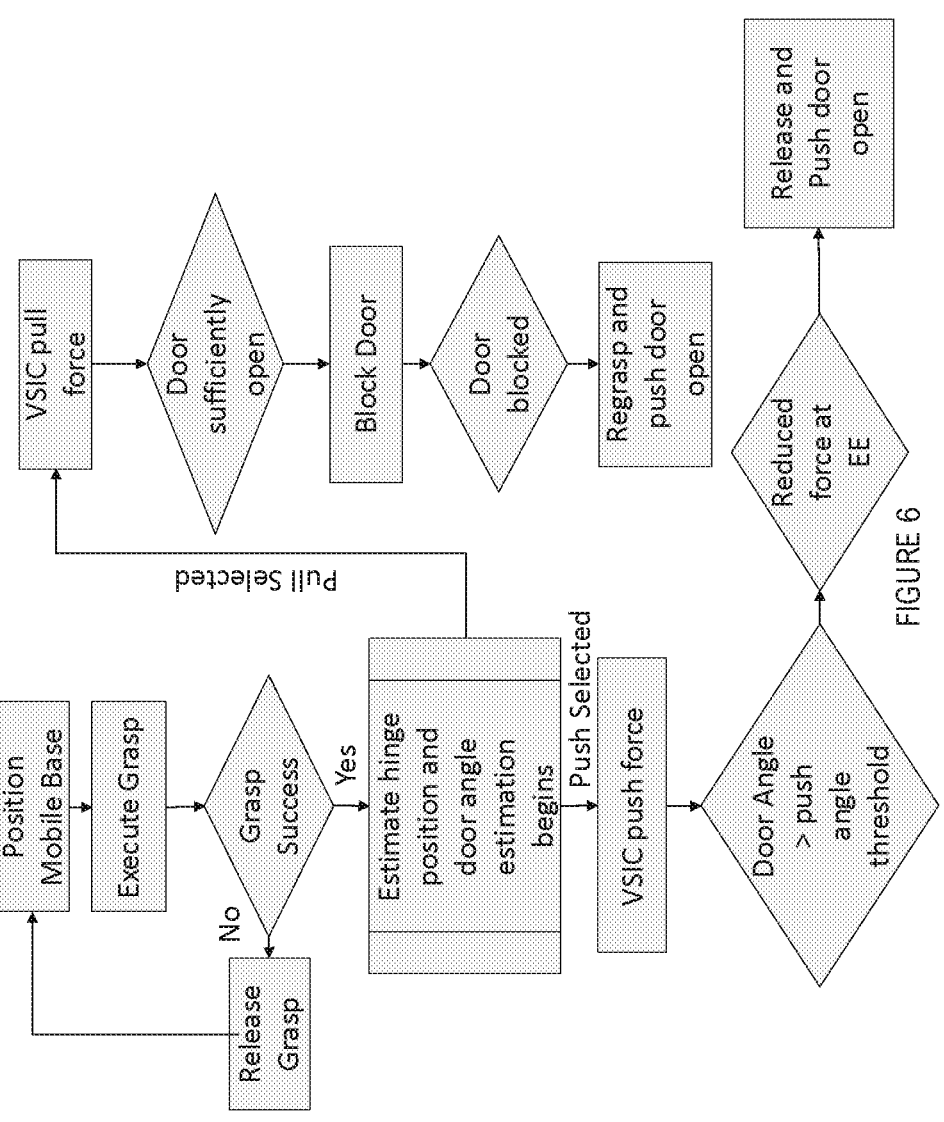
FIG. 6 depicts the door opening state machine.

FIG. 6 depicts the door opening state machine. In accordance with the preferred embodiment of the present invention, to begin the door opening procedure, the gripper is positioned in a pre-grasp pose with respect to the door handle or knob. This can be done by several methods including: the user teleoperating the arm joints using jointwise velocity control to align the gripper with the door handle or knob; the user teleoperating the arm joints using end-effector task-space velocity control to align the gripper with the door handle or knob; the user indicating the door handle to the robot by tapping on the door handle in a user interface, and the robot can plan a trajectory for the end-effector to navigate to the pre-grasp pose while avoiding collisions with other parts of the robot or any object in the environment; and the robot automatically identifying door handles or knobs and navigate the end-effector to a suitable pre-grasp pose. In each of the above cases, the robot body may either stay stationary while the arm navigates to the pre-grasp pose or follow the end-effector in order to extend its workspace. In the former case, the robot body must first be brought close to the door handle so that the arm can reach the door handle, but in the latter case, the robot can do that automatically.

When a legged robot attempts to open a door, it should carefully align its mobile base to ensure effective manipulation. The mobile base and the limbs should be aligned so that its appendages can exert force in a direction that aligns with the door's opening mechanism while maintaining a stable contact with the doorknob, handle, or bar. For a handle-operated door, this means positioning the robot at an angle that allows its grippers or manipulators to reach and turn the handle comfortably. For a push-door scenario, the robot should align itself directly in front of the door to apply even pressure across the door's surface. Proper alignment ensures that the robot can exert the necessary force efficiently while maintaining balance and stability. Next, the door handle or knob must be grasped by the gripper. This can be done by several methods, including teleoperation of the arm joints by a user with joint-wise or end-effector velocity control and then closing the gripper fingers using velocity control or a "gripper close" command, or alternatively, allowing the robot to automatically complete the grasp.

Once the gripper closes around the door handle or knob, the robot uses proprioceptive sensory information, such as joint positions and currents, to determine if the grasp was successful. Upon detecting the unsuccessful grasp, the robot notifies the user or a high-level algorithm about the failure. The system then prepares for another attempt at grasping the door handle or knob. This subsequent attempt may involve repositioning the arm, moving the mobile base, and/or adjusting the grip strength. If the grasp is successful, the robot proceeds to the next step in the process of door opening. If the grasp fails again, the system repeats the notification and adjustment process, potentially incorporating additional diagnostic steps or user intervention through teleoperation. Next, the door handle or knob must be turned to unlatch the door if it is latched. To do this, the user or high-level algorithm can use end-effector or joint-wise velocity control to affect a roll of the hand about an axis that points outward from the gripper. The torque applied along this roll axis is provided as feedback to the user in the user interface. Next, the impedance of the wrist (if present) is set to minimize any moments along the vertical axis, so that motion of the door about a vertical hinge is not resisted by the wrist. The virtual force applied by the arm at the end-effector is selected according to a virtual spring impedance controller ("VSIC"). With this controller, we ensure that the position of the door contact point with respect to the robot stays at a controlled distance. This controller may ensure a minimum force is applied in the case of push door opening without a gripper to ensure contact is maintained. This spring controller applies a force along a direction as described in the different methods below.

With the VSIC active, the robot base is manually driven by a user or higher-level algorithm. The driving direction may be forward, toward the door in the case of a push door, or backward, away from the door in the case of a pull door. Due to the VSIC, a force is applied to the door that begins to move it forward or backward, respectively. As the door moves, the force application direction can be selected in two ways: The user must select from four options: push door left, push door right, pull door left, pull door right. The robot can also automatically determine the selection based on the driving direction and the proprioceptive estimation of the location of the door hinge. Depending on the selection, a force application direction is pre-selected to roughly be normal to the door direction, in the VSIC. Due to the selection of door opening direction, this results in a consistent moment on the door, resulting in the door opening.

Data is gathered about the kinematic constraint imposed by the door hinge via data of the gripper position over time. Previous works have proposed numerous approaches for this kind of estimation including learning from data and kinematics.

Using the door estimate, a path is planned for the robot arm to release the door grasp and navigate to the second side of the door. Only a non-prehensile pushing force is necessary to hold the door open. The fore/aft assistance controller can be disabled after the secondary grasp is established on the second side of the door. Consequent user inputs or higher-level algorithms may drive the robot base forward, through the door opening, or backward if it is undesirable to proceed through the door. Optionally, a slip detection controller may be used if a gripper is not present. This controller detects the direction of motion and compares it to the direction of force, to estimate the required coefficient of friction for that motion. If the required coefficient of friction is higher than the assumed available coefficient of friction, a slip condition is triggered and the door opening operation is terminated. Optionally, a door assist controller can additionally be activated and maintain the lateral position of the robot in the door opening. Using the estimated door hinge location and a standard door size, the lateral position of the robot can be controlled in the center of the door opening or door frame.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

What is claimed is:

1. A system for proprioceptive and responsive robotic door opening, said system comprising:

a legged robot comprising a robot base, one or more legs attached to said robot base and configured to locomote across a variety of terrain and able to withstand toppling forces from door-opening interactions, and at least one robot arm, said robot arm comprising an arm base, a plurality of arm base actuators, an arm first link, an arm second link, a plurality of wrist actuators, an end-effector, and at least one camera;

a user interaction device; and a processor coupled to a memory, said processor configured to send and receive data from said user interaction device and said legged robot, wherein upon receiving a command to execute door-opening instructions, said processor causes said legged robot to:

approach a door;

engage with a door-opening mechanism associated with said door using said end-effector to open said door while maintaining a controlled distance to said door until said door is opened;

advance at least a portion of said legged robot through a door frame of said door; and autonomously maintain contact with said door by one of a part of said robot arm or a part of said legged robot in order to maintain an open position of said door until said legged robot has cleared through a door frame.

2. The system of claim 1, wherein said door-opening mechanism is a doorknob.

3. The system of claim 1, wherein said door-opening mechanism is a door handle.

4. The system of claim 1, wherein said door-opening mechanism is a push-bar.

5. The system of claim 1, wherein said user interaction device comprises at least one joystick.

6. The system of claim 1, wherein said user interaction device receives visual and audio data from said robot.

7. The system of claim 1, wherein said end-effector is a gripper with gripper jaws.

8. A method for proprioceptive and responsive robotic door opening, said method comprising:

sending instructions from a user interaction device to a robot, said robot configured to locomote across a variety of terrain and able to withstand toppling forces from door-opening interactions, said robot comprising a robot base, a processor, one or more legs, and at least one robotic arm comprising an arm base, a plurality of arm base actuators, an arm first link, an arm second link, a gripper with gripper jaws, at least one camera, and a wrist comprising a plurality of wrist actuators;

positioning said gripper in a pre-grasp pose at an algorithmically calculated angle with respect to a door-opening mechanism;

aligning said robot base and said one or more legs with said door-opening mechanism;

closing said gripper on said door-opening mechanism;

confirming, using proprioceptive sensory information collected via said robot, that a grasp of said door-opening mechanism is successful;

manipulating said door-opening mechanism via controlling the velocity of said gripper along a roll axis;

setting an impedance of said wrist to minimize moments along a vertical axis;

selecting a virtual force to be applied by said arm at said gripper according to a virtual spring impedance controller in order to ensure that a position of a door contact point with respect to said robot stays at a controlled distance;

driving said robot in a direction that matches an opening direction of said door;

determining, by said processor, a kinematic constraint imposed by a door hinge from gripper position data collected over time;

planning a path for said gripper to release said door opening mechanism and navigating through a door frame associated with said door; and maintaining a lateral position of said robot at the center of said door frame with respect to an estimated door hinge location, and autonomously maintaining contact with said door by one of a part of said robot arm or a part of said legged robot in order to maintain an open position of said door until said legged robot has cleared through a door frame.

9. The method of claim 8, wherein said door-opening mechanism is a doorknob.

10. The method of claim 8, wherein said door-opening mechanism is a door handle.

11. The method of claim 8, wherein said door-opening mechanism is a push-bar.

12. The method of claim 8, wherein said door is a push door, and said robot is navigated accordingly.

13. The method of claim 8, wherein said door is a pull door, and said robot is navigated accordingly.

14. The method of claim 8, wherein said robot is in communication with a user interaction device capable of controlling at least one aspect of robot navigation.

15. The method of claim 8, further comprising:

determining, by said processor, said door opens away from said robot base;

determining, by said processor, a kinematic constraint imposed by a door hinge from gripper position data;

estimating a location of said door opening using said kinematic constraint;

navigating said robot base through a door frame associated with said door while at least a portion of the robot holds open said door autonomously; and maintaining a lateral position of said robot near a center of said door frame with respect to an estimated door hinge location.

16. The method of claim 8, further comprising: determining, by said processor, said door opens toward said robot base determining, by said processor, a kinematic constraint imposed by a door hinge from gripper position data;

estimating a location of said door opening using said kinematic constraint;

determining, by said processor, said door is sufficiently open;

employing door-blocking to maintain sufficient opening of said door;

planning a path for said gripper to release said door-opening mechanism and regrasp said door using said arm on an opposite side of said door;

navigating said robot base through a door frame associated with said door while maintaining sufficient opening of said door; and maintaining a lateral position of said robot near a center of said door frame with respect to an estimated door hinge location.

17. The method of claim 16, wherein said door-blocking comprises positioning at least a portion of said robot body in a closing path of said door.

18. The method of claim 16, wherein said door-blocking comprises positioning of one or more of a robot leg or robot foot in a closing path of said door.

19. The method of claim 16, wherein a door-blocking mechanism is not required because the door is not weighted or sprung to close automatically.

20. A system for proprioceptive and responsive robotic door opening, said system comprising:

a legged robot comprising a robot base, one or more legs attached to said robot base and configured to locomote across a variety of terrain, in multiple directions, able to withstand toppling forces from door-opening interactions, and at least one robot arm, said robot arm comprising an arm base, a plurality of arm base actuators, an arm first link, an arm second link, a plurality of wrist actuators, a gripper, and at least one camera;

a user interaction device; and a processor coupled to a memory, said processor configured to send and receive data from said user interaction device and said legged robot, wherein upon receiving a command to execute door-opening instructions, said processor causes said legged robot to:

position said gripper in a pre-grasp pose with respect to a door-opening mechanism, wherein said door-opening mechanism is identified by said legged robot;

align said robot base and said one or more legs with said door-opening mechanism;

close said gripper on said door-opening mechanism;

confirm, using proprioceptive sensory information collected via said robot, that a grasp of said door-opening mechanism is successful;

manipulate said door-opening mechanism via controlling the velocity of said gripper along a roll axis;

set an impedance of said wrist to minimize moments along a vertical axis; select a virtual force to be applied by said arm at said gripper according to a virtual spring impedance controller in order to ensure that a position of a door contact point with respect to said robot stays at a controlled distance; drive said robot in a direction that matches an opening direction of said door;

determine a kinematic constraint imposed by a door hinge from gripper position data collected over time;

plan a path for said gripper to release said door opening mechanism and navigate through a door frame associated with said door; and maintain a lateral position of said robot at the center of said door frame with respect to an estimated door hinge location.

21. The system of claim 20, wherein said door-opening mechanism is a doorknob.

22. The system of claim 20, wherein said door-opening mechanism is a door handle.

23. The system of claim 20, wherein said door-opening mechanism is a push-bar.

24. The system of claim 20, wherein said user interaction device comprises at least one joystick.

25. The system of claim 20, wherein said user interaction device receives visual and audio data from said robot.

*     *     *     *     *